(12) United States Patent
Qiu et al.

(10) Patent No.: US 10,798,890 B2
(45) Date of Patent: Oct. 13, 2020

(54) ECCENTRIC SWINGING STEPWISE ROLLBACK-TYPE REEL SPRINKLING IRRIGATION MACHINE

(71) Applicants: JIANGSU HUAYUAN WATER-SAVING CO., LTD, Jiangsu (CN); China University of Mining and Technology, Jiangsu (CN)

(72) Inventors: Zhipeng Qiu, Jiangsu (CN); Tao Peng, Jiangsu (CN); Peiyong Liu, Jiangsu (CN); Jinxiang Zhang, Jiangsu (CN); Zhencai Zhu, Jiangsu (CN); Fan Jiang, Jiangsu (CN)

(73) Assignees: JIANGSU HUAYUAN WATER-SAVING CO., LTD, Jiangsu (CN); China University of Mining and Technology, Jiangsu (CN)

(*) Notice: Subject to any disclaimer, the term of this patent is extended or adjusted under 35 U.S.C. 154(b) by 0 days.

(21) Appl. No.: 16/334,756

(22) PCT Filed: Jun. 25, 2018

(86) PCT No.: PCT/CN2018/092575
§ 371 (c)(1),
(2) Date: Mar. 20, 2019

(87) PCT Pub. No.: WO2019/105026
PCT Pub. Date: Jun. 6, 2019

(65) Prior Publication Data
US 2020/0128766 A1    Apr. 30, 2020

(30) Foreign Application Priority Data
Nov. 30, 2017 (CN) .......................... 2017 1 1239830

(51) Int. Cl.
*A01G 25/16* (2006.01)
*A01G 25/09* (2006.01)
(Continued)

(52) U.S. Cl.
CPC .......... *A01G 25/16* (2013.01); *A01G 25/097* (2013.01); *A01G 25/02* (2013.01); *A01G 25/095* (2013.01); *B65H 75/425* (2013.01)

(58) Field of Classification Search
CPC ...... A01G 15/02; A01G 15/09; A01G 15/092; A01G 15/095; A01G 15/097; A01G 15/16
(Continued)

(56) References Cited

U.S. PATENT DOCUMENTS 4,174,809 A * 11/1979 Arlemark ............. A01G 25/095
137/355.2
4,186,881 A *  2/1980 Long .................... A01G 25/095
137/355.12
(Continued)

FOREIGN PATENT DOCUMENTS

CN    201374943    1/2010
CN    106376435    2/2017
(Continued)

OTHER PUBLICATIONS

"International Search Report (Form PCT/ISA/210)", dated Sep. 7, 2018, pp. 1-5.

*Primary Examiner* — Jason J Boeckmann
(74) *Attorney, Agent, or Firm* — JCIPRNET

(57) ABSTRACT

An eccentric swinging stepwise rollback-type reel sprinkling irrigation machine includes a chassis, a locking-type reel, a sprinkling irrigation apparatus, and a stepwise driving apparatus. A locking channel in a circumferential direction is disposed on the locking-type reel. The stepwise driving apparatus includes a water turbine gearbox, an eccentric (Continued)

swinging mechanism, an upper caliper, and a lower caliper. The upper caliper and the lower caliper are clamped to be mounted on the locking channel. A water turbine is used in the eccentric swinging stepwise rollback-type reel sprinkling irrigation machine to drive the eccentric swinging mechanism to realize an eccentric swing, so as to drive the upper caliper to move up and down to be engaged with the locking channel of the locking-type reel intermittently, thereby driving the locking-type reel to roll back intermittently to automatically reel in a sprinkling irrigation PE hose.

10 Claims, 6 Drawing Sheets

(51) Int. Cl.
*A01G 25/02* (2006.01)
*B65H 75/42* (2006.01)

(58) Field of Classification Search
USPC .................................. 239/722, 723, 743, 745
See application file for complete search history.

(56) References Cited

U.S. PATENT DOCUMENTS

| | | | |
|---|---|---|---|
| 4,232,826 A * | 11/1980 | Broughton | ........... A01G 25/095 |
| | | | 239/112 |
| 9,301,459 B1 | 4/2016 | Williams | |

FOREIGN PATENT DOCUMENTS

| | | | | |
|---|---|---|---|---|
| CN | 107853142 | | 3/2018 | |
| CN | 108029532 | | 5/2018 | |
| CN | 207505649 | | 6/2018 | |
| DE | 202012011208 | | 12/2012 | |
| EP | 2147592 A1 * | | 1/2010 | ........... A01G 25/095 |
| FR | 2393527 A1 * | | 1/1979 | ........... A01G 25/095 |
| WO | WO-8800036 A1 * | | 1/1988 | ........... A01G 25/095 |
| WO | WO-0106841 A1 * | | 2/2001 | ........... A01G 25/095 |

* cited by examiner

ECCENTRIC SWINGING STEPWISE ROLLBACK-TYPE REEL SPRINKLING IRRIGATION MACHINE

CROSS-REFERENCE TO RELATED APPLICATION

This is a 371 application of the International PCT application serial no. PCT/CN2018/092575, filed on Jun. 25, 2018 which claims the priority benefits of China Application No. 201711239830.X filed on Nov. 30, 2017. The entirety of each of the above-mentioned patent applications is hereby incorporated by reference herein and made a part of this specification.

BACKGROUND

Technical Field

The present invention relates to a reel sprinkling irrigation machine, and specifically, to an eccentric swinging stepwise rollback-type reel sprinkling irrigation machine that is suitable for sprinkling irrigation of a landscape architecture, and that belongs to the technical field of sprinkling irrigation devices for landscape architectures.

Description of Related Art

A landscape architecture refers to a sightseeing and resting place with a beautiful environment, built by reconstructing a terrain (or further making a hill, stacking stones, and designing water), planting trees and flowers, constructing buildings, and laying out paths using an engineering and artistic means in a certain area. A landscape architecture usually includes grounds, private gardens, small parks, gardens, parks, botanical gardens, and so on. A landscape architecture is used for not only sightseeing and resting, but also for protecting and improving an environment, and actively promotes urban greening and environmental protection.

Sprinkling irrigation is an irrigation method for using a special device such as a sprinkler to sprinkle pressurized water into the air, and forming water drops to fall onto the ground and surface of plants. A sprinkling machine is also referred to as sprinkling equipment or a sprinkler unit, that is, a special device for sprinkling irrigation.

Landscape architectures are mostly irrigated by sprinklers at present. That is, a sprinkler is fixedly mounted and is pre-buried at a fixed position of an underground water delivery pipeline through a connection hose, and sprinkling irrigation water is sprinkled from a sprinkler through a pumping station and a water delivery pipeline, so as to perform fixed-point sprinkling irrigation. Such a conventional sprinkling irrigation manner has the following defects.

1. A water delivery pipeline needs to be pre-buried when a landscape architecture is built. Not only an amount of work is huge, but also a pre-buried water delivery pipeline cannot be maintained easily and cannot be checked easily when a fault or water leakage occurs.

2. A layout of a water delivery pipeline may be influenced by factors such as a shape of a plot of a landscape architecture, a ground slope, and a planting direction of vegetation, causing work to increase virtually.

3. Since a fixed-point sprinkling irrigation manner is used and a single sprinkler covers a limited area, a suitable spacing between sprinklers needs to be set to avoid dead corners of sprinkling irrigation.

4. A pumping station usually needs to be located at a central position of a plot to reduce use of water pipes and loss of water in the water pipes, thereby reducing investment costs and operation costs, but an additional pumping station water pipeline usually needs to be pre-buried for a pumping station that is far away from a water source and cannot be maintained easily either.

5. Due to influence of gravity of sprinkling irrigation water sprinkled from the sprinkler, the quantity of water distributed in the soil in a horizontal direction is reduced gradually from the sprinkler as a center to the outside during a sprinkling irrigation process, and the cross-section has a tapered structure. Although a suitable spacing between sprinklers can avoid dead corners of sprinkling irrigation, a phenomenon of non-uniform irrigation and waste of water resources are still caused.

SUMMARY

In view of the foregoing problems, the present invention provides an eccentric swinging stepwise rollback-type reel sprinkling irrigation machine that can reduce water resources, reduce an amount of work, and simultaneously realize uniform sprinkling irrigation, and is especially suitable for sprinkling irrigation of a landscape architecture.

To achieve the foregoing objective, the eccentric swinging stepwise rollback-type reel sprinkling irrigation machine includes a chassis, a locking-type reel, a sprinkling irrigation apparatus, and a stepwise driving apparatus.

The chassis is a box-shaped support frame structure with a top portion, a bottom portion, and a rear portion that are open. A support wheel is provided at a rear end of the bottom portion of the chassis, front supports that incline toward a lower forward direction are respectively disposed on left and right sides of a front end of the bottom portion of the chassis, and a holding beam that is disposed in a horizontal direction and fixedly connected to the two front supports is disposed between the two front supports.

The locking-type reel includes a cylinder, wing plates, and reel rotation shafts. The cylinder is a hollow cylindrical structure. The wing plates have a disk-shaped structure, a quantity of the wing plates is set to two, the two wing plates are coaxial with the cylinder respectively and fixedly disposed at two ends of the cylinder, a size of an outer diameter of the wing plates is greater than a size of an outer diameter of the cylinder, opposite inner surfaces of the two wing plates and an outer surface of the cylinder together form an accommodating space for a sprinkling irrigation PE hose, an outer surface of at least one wing plate further has a locking channel protruding from an outer surface of the wing plate, the locking channel is set to be a sealed ring structure along a circumferential edge position of the wing plate, and the ring structure is disposed concentrically with the wing plate. A quantity of the reel rotation shafts is set to two, the reel rotation shafts are coaxially disposed at the central positions of the two wing plates in a left-to-right symmetric arrangement, the reel rotation shafts have a hollow sleeve structure, and the locking-type reel is set to roll back and forth and is mounted on the chassis through the reel rotation shafts.

The sprinkling irrigation apparatus includes a sprinkling irrigation PE hose, a water turbine box, a pressurized water axial end input joint, a sprinkler support mechanism, and a sprinkler. The water turbine box is fixedly mounted at a rear end of the chassis, a water turbine is disposed in the water turbine box, a pressurized water input joint is disposed at an input end of the water turbine box, an output end of the water turbine box is connected to and is in communication with an input end of the pressurized water axial end input joint through a pipeline. An output end of the pressurized water axial end input joint is coaxially and fixedly mounted at an axial end of one reel rotation shaft of the locking-type reel. The sprinkling irrigation PE hose is wound on the cylinder of the locking-type reel, an input end of the sprinkling irrigation PE hose penetrates into the cylinder of the locking-type reel and is connected to and is in communication with the output end of the pressurized water axial end input joint, and an output end of the sprinkling irrigation PE hose extends out from a top of the holding beam of the chassis. The sprinkler includes a sprinkler connection hose mounted on the sprinkler support mechanism in a vertical direction and a sprinkler head mounted at a top of the sprinkler connection hose, and a bottom end of the sprinkler connection hose of the sprinkler is connected to and is in communication with the output end of the sprinkling irrigation PE hose.

The stepwise driving apparatus includes a water turbine gearbox, an eccentric swinging mechanism, an upper caliper, and a lower caliper. The water turbine gearbox is fixedly mounted at a rear end of the chassis at a position corresponding to the water turbine box, an input shaft of the water turbine gearbox and a water turbine in the water turbine box are connected coaxially and fixedly, an output shaft of the water turbine gearbox is disposed horizontally in a left-to-right direction. When the chassis is in a horizontal state, a height of an axial line of the output shaft of the water turbine gearbox from the ground is less than a height of the axial line of the locking-type reel from the ground. The eccentric swinging mechanism is fixedly mounted at an axial end of the output shaft of the water turbine gearbox at a position corresponding to the locking channel. The upper caliper is disposed in a front-to-back direction and mounted between the eccentric swinging mechanism and the locking channel, the upper caliper includes a bayonet portion and a pallet portion, the bayonet portion includes a bayonet that is disposed along a left-to-right opening and clamped in the locking channel, a width size of the bayonet is in clearance fit with a thickness size of the locking channel, the pallet portion is a lengthwise plank structure disposed in a back-to-forth direction, a front end of the pallet portion is fixedly connected to the bayonet portion, and a rear end is in butt joint of the eccentric swinging mechanism. A structure of the lower caliper is the same as a structure of the upper caliper and the lower caliper is located exactly below the upper caliper, a bayonet of the bayonet portion of the lower caliper is clamped on the locking channel, and a rear end of the pallet portion of the lower caliper is in butt joint of the chassis.

In an improved solution of the present invention, a pallet portion positioning groove arranged in a circumferential direction is disposed on the eccentric swinging mechanism, a width size of the pallet portion positioning groove fits in with a width size of the pallet portion of the upper caliper, and a rear end of the pallet portion of the upper caliper is in butt joint of the pallet portion positioning groove.

In an implementation of the eccentric swinging mechanism of the present invention, the eccentric swinging mechanism is an eccentric wheel structure eccentrically mounted with the output shaft of the water turbine gearbox, and the pallet portion positioning groove is disposed on a wheel surface of the eccentric wheel structure in a radial direction.

In another implementation of the eccentric swinging mechanism of the present invention, the eccentric swinging mechanism includes a support wheel and an eccentric shaft. The support wheel is coaxially and fixedly connected to the output shaft of the water turbine gearbox. A central axis of the eccentric shaft is disposed to be parallel to a central axis of the support wheel and a bottom end of the eccentric shaft is eccentrically mounted on an end face of the support wheel, and a top end of the eccentric shaft further includes a positioning boss. The pallet portion positioning groove is disposed in a ring-shaped space between the end face of the support wheel and the positioning boss of the eccentric shaft.

In a further improved solution of the present invention, the stepwise driving apparatus further includes a rollback automatic stopping mechanism. The rollback automatic stopping mechanism includes a limiting swing retaining frame, a transmission connecting rod or a wire rope, and a swing holding rod. The limiting swing retaining frame is hingedly connected to and mounted at a front end of the chassis horizontally in a left-to-right direction, a rod body of the swing holding rod is hingedly connected to and mounted at the rear end of the chassis corresponding to a position between the upper caliper and the lower caliper, a rear end of the limiting swing retaining frame is connected to a front end of the rod body of the swing holding rod through the transmission connecting rod or the wire rope, and reset springs are disposed both between the limiting swing retaining frame and the chassis and between the rod body of the swing holding rod and the chassis.

In a further improved solution of the present invention, the sprinkling irrigation apparatus further includes a pipe row mechanism. The pipe row mechanism includes a forward and backward 8-shaped spiral shaft and a pipe row sleeve. The forward and backward 8-shaped spiral shaft is set at a front end of the chassis horizontally in a left-to-right direction and is located above the holding beam, and the forward and backward 8-shaped spiral shaft is connected to chains of the reel rotation shafts of the locking-type reel in a transmission manner through a transmission chain. The pipe row sleeve is sleeved over the forward and backward 8-shaped spiral shaft, and the output end of the sprinkling irrigation PE hose passes through a U-shaped connection member disposed on the pipe row sleeve to be connected to and in communication with a bottom end of the sprinkler connection hose on the sprinkler.

In a further improved solution of the present invention, the sprinkling irrigation apparatus further includes a pressurized pipe mechanism. The pressurized pipe mechanism includes a pressurized pipe frame and a tension spring. The pressurized pipe frame is a portal frame structure, a width size of the portal frame structure fits in with a length size of the cylinder of the locking-type reel and the portal frame structure is clamped between the two wing plates of the locking-type reel, and a bottom end of the pressurized pipe frame is hingedly connected to and mounted on two side walls of the chassis in a left-to-right direction. One end of the tension spring is connected to the portal frame structure of the pressurized pipe frame and the other end is connected to a side wall of the chassis.

In a further improved solution of the present invention, a flow adjustment valve is disposed on the pressurized water input joint of the water turbine box, the pressurized pipe mechanism is disposed behind the locking-type reel, and a hinged shaft at the bottom end of the pressurized pipe frame is connected to the flow adjustment valve through a connection rod mechanism.

In an implementation of the sprinkler support mechanism of the present invention, the sprinkler support mechanism is a holding plate structure that is in horizontal arrangement or that leans forward.

In another implementation of the sprinkler support mechanism of the present invention, the sprinkler support mechanism is a sprinkler wagon structure.

Compared with the prior art, a water turbine is used in the eccentric swinging stepwise rollback-type reel sprinkling irrigation machine to drive the eccentric swinging mechanism to realize an eccentric swing, so as to drive the upper caliper to move up and down to be engaged with the locking channel of the locking-type reel intermittently, thereby driving the locking-type reel to roll back intermittently to automatically reel in a sprinkling irrigation PE hose. During an intermittent rollback process of the locking-type reel, the lower caliper can prevent the locking-type reel from reversing. The whole structure is simple, may perform sprinkling irrigation on vegetation of a landscape architecture conveniently, and may be used flexibly and maintained easily. A water delivery pipeline does not need to be pre-buried in a sprinkling irrigation area of a landscape architecture and problems such as a spacing between sprinklers do not need to be considered. The self-moving sprinkling irrigation manner may realize horizontal and uniform distribution of water resources in sprinkled and irrigated soil in a precondition of reducing water resources, ensure uniform irrigation, reduce an amount of work of construction of a landscape architecture, and reduce construction costs, and is especially suitable for sprinkling irrigation of a landscape architecture.

DESCRIPTION OF THE EMBODIMENTS

The present invention is further described with reference to the accompanying drawings (a direction of pulling out a sprinkling irrigation PE hose is considered as a forward direction).

Figure 1:
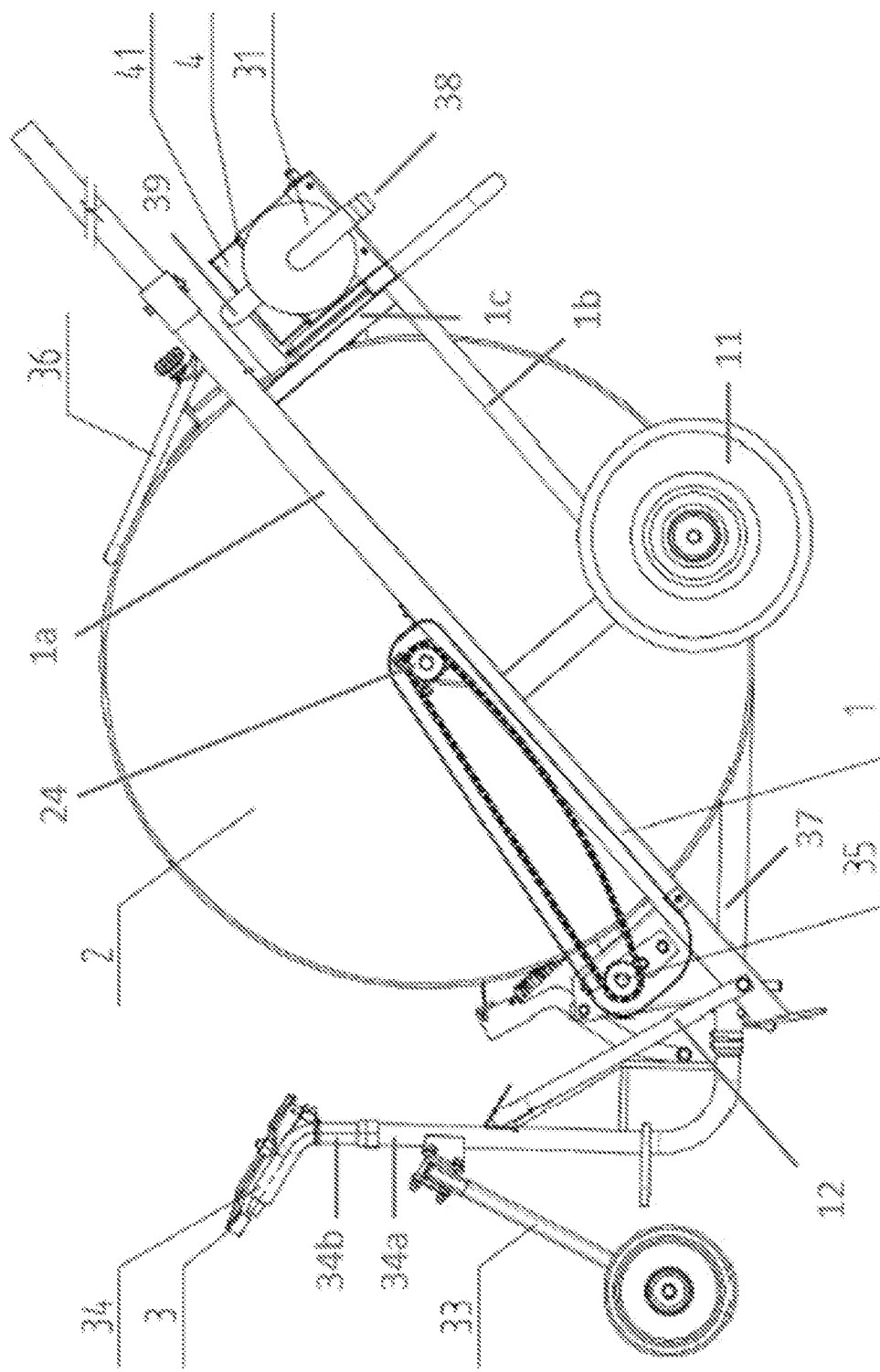
FIG. 1 is a schematic structural diagram of the present invention.
Figure 2:
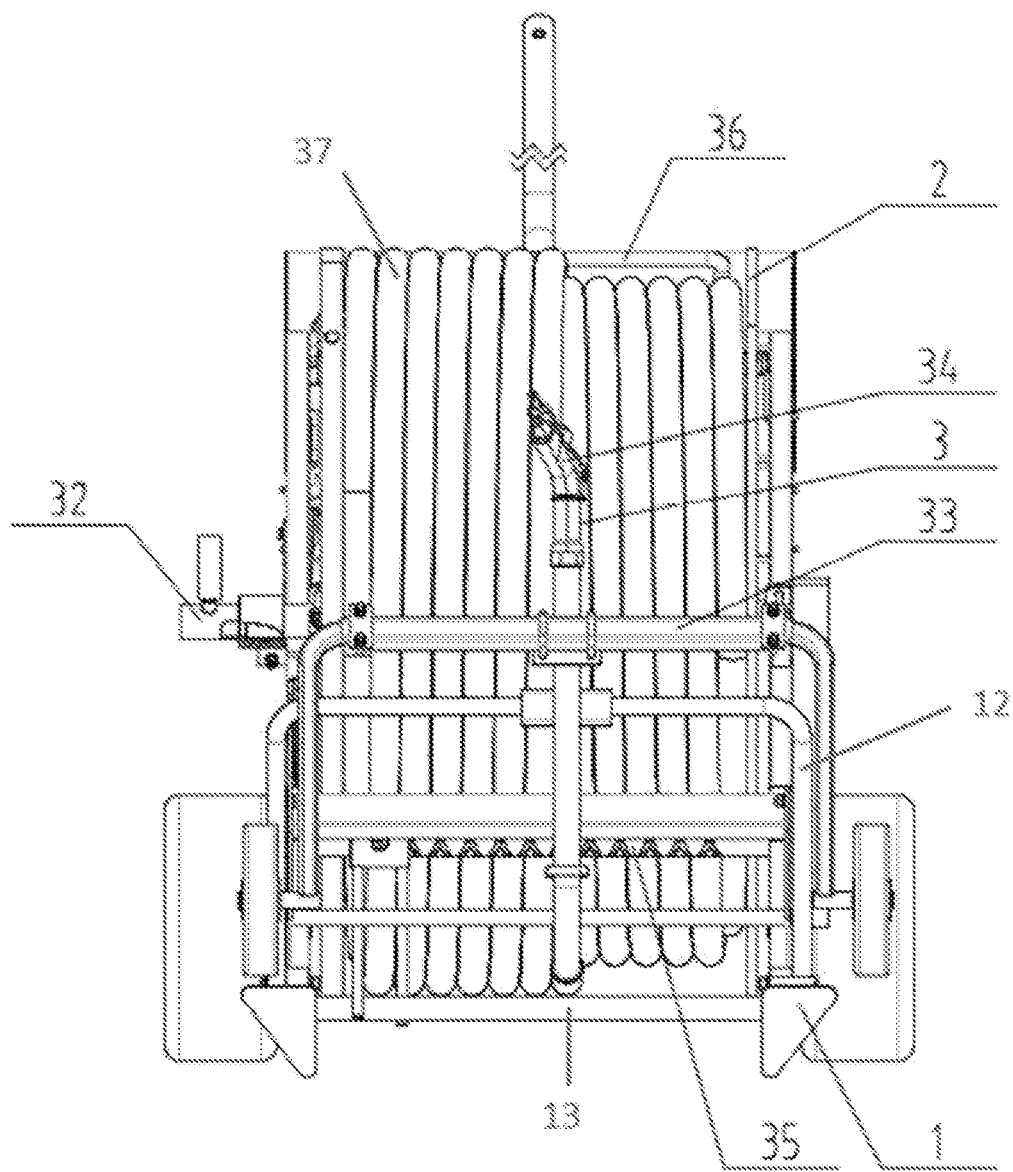
FIG. 2 is a left view of FIG. 1.
Figure 3:
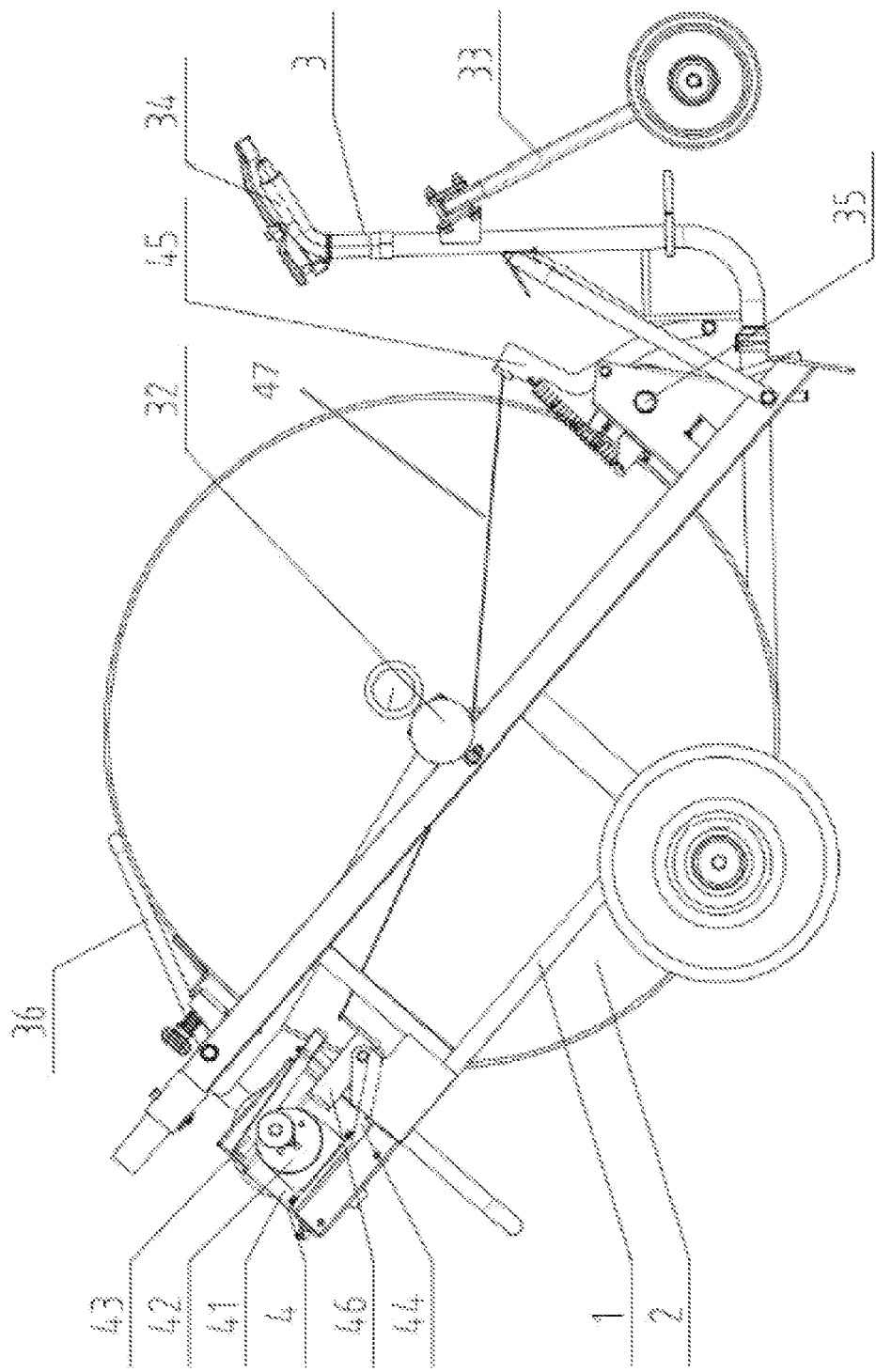
FIG. 3 is a rear view of FIG. 1.

As shown in FIG. 1, FIG. 2, and FIG. 3, the eccentric swinging stepwise rollback-type reel sprinkling irrigation machine includes a chassis 1, a locking-type reel 2, a sprinkling irrigation apparatus 3, and a stepwise driving apparatus 4.

The chassis 1 is a box-shaped support frame structure with a top portion 1a, a bottom portion 1b, and a rear portion 1c that are open. A support wheel 11 is provided at a rear end of the bottom portion 1b of the chassis 1, front supports 12 that incline toward a lower forward direction are respectively disposed on left and right sides of a front end of the bottom portion 1b of the chassis 1, and a holding beam 13 that is disposed in a horizontal direction and fixedly connected to the two front supports 12 is disposed between the two front supports 12.

Figure 4:
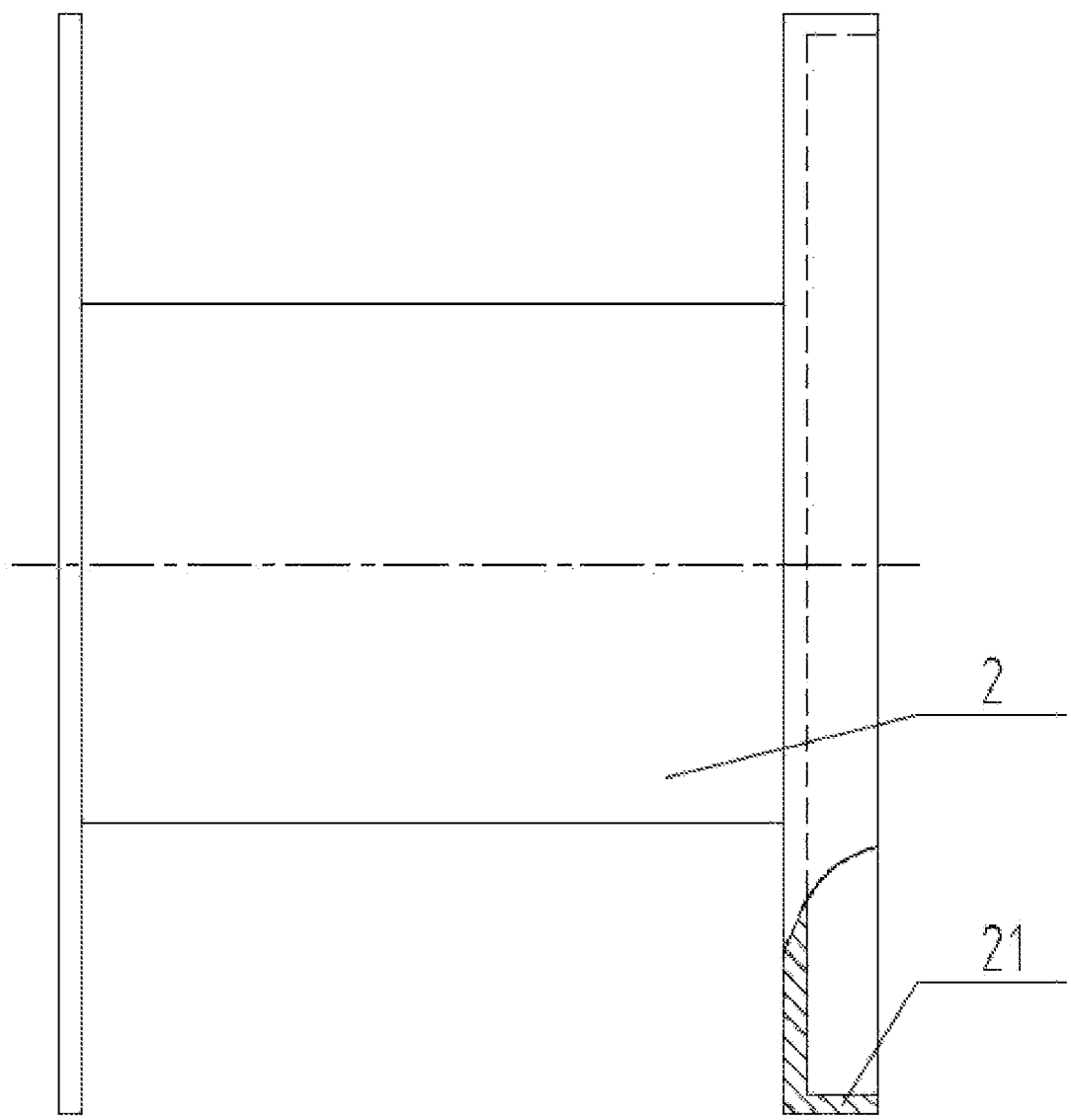
FIG. 4 is a schematic structural diagram of the locking-type reel according to the present invention.

The locking-type reel 2 includes a cylinder, wing plates, and reel rotation shafts 24. The cylinder is a hollow cylindrical structure. The wing plates have a disk-shaped structure, a quantity of the wing plates is set to two, the two wing plates are coaxial with the cylinder respectively and fixedly disposed at two ends of the cylinder, a size of an outer diameter of the wing plates is greater than a size of an outer diameter of the cylinder, opposite inner surfaces of the two wing plates and an outer surface of the cylinder together form an accommodating space for a sprinkling irrigation PE hose. As shown in FIG. 4, an outer surface of at least one wing plate further has a locking channel 21 protruding from an outer surface of the wing plate 21, the locking channel 21 is set to be a sealed ring structure along a circumferential edge position of the wing plate, and the ring structure is disposed concentrically with the wing plate. A quantity of the reel rotation shafts 24 is set to two, the reel rotation shafts 24 are coaxially disposed at the central positions of the two wing plates in a left-to-right symmetric arrangement, the reel rotation shafts 24 have a hollow sleeve structure, and the locking-type reel 2 is set to roll back and forth and is mounted on the chassis 1 through the reel rotation shafts 24.

The sprinkling irrigation apparatus 3 includes a sprinkling irrigation PE hose 37, a water turbine box 31, a pressurized water axial end input joint 32, a sprinkler support mechanism 33, and a sprinkler 34. The water turbine box 31 is fixedly mounted at a rear end of the chassis 1, a water turbine 31a is disposed in the water turbine box 31, a pressurized water input joint 38 is disposed at an input end of the water turbine box 31, an output end of the water turbine box 31 is connected to and is in communication with an input end of the pressurized water axial end input joint 32 through a pipeline 39. An output end of the pressurized water axial end input joint 32 is coaxially and fixedly mounted at an axial end of one reel rotation shaft of the locking-type reel 2. The sprinkling irrigation PE hose 37 is wound on the cylinder of the locking-type reel 2, an input end of the sprinkling irrigation PE hose 37 penetrates into the cylinder of the locking-type reel 2 and is connected to and is in communication with the output end of the pressurized water axial end input joint 32, and an output end of the sprinkling irrigation PE hose 37 extends out from a top of the holding beam 13 of the chassis 1. The sprinkler 34 includes a sprinkler connection hose 34a mounted on the sprinkler support mechanism 33 in a vertical direction and a sprinkler head 34b mounted at a top of the sprinkler connection hose 34a, and a bottom end of the sprinkler connection hose 34a of the sprinkler 34 is connected to and is in communication with the output end of the sprinkling irrigation PE hose 37.

Figure 5:
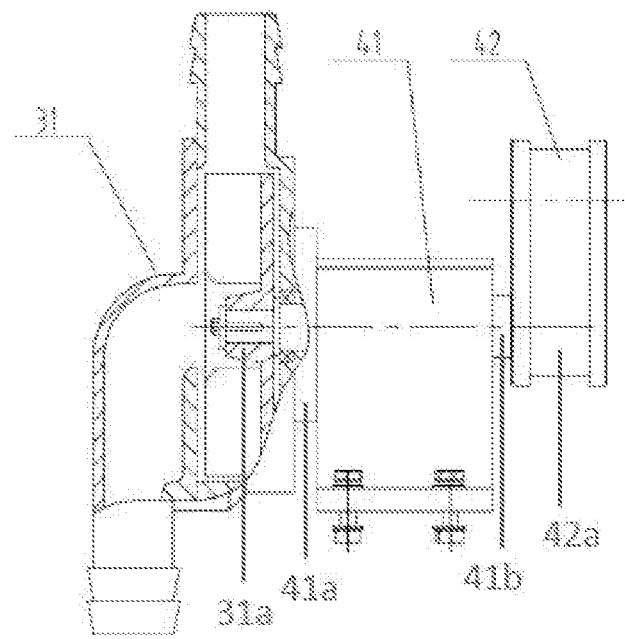
FIG. 5 is a schematic diagram of a connection structure of a water turbine box, a water turbine gearbox, and an eccentric swinging mechanism in an implementation according to the present invention.
Figure 6:
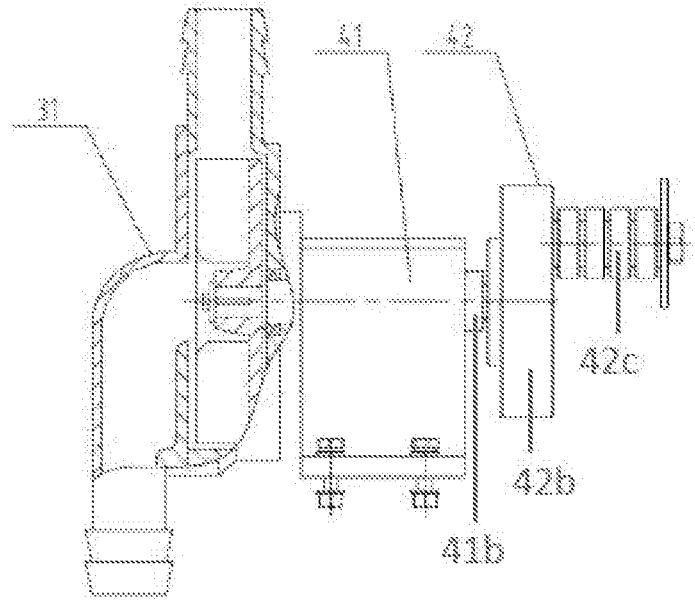
FIG. 6 is a schematic diagram of a connection structure of a water turbine box, a water turbine gearbox, and an eccentric swinging mechanism in another implementation according to the present invention.
Figure 7:
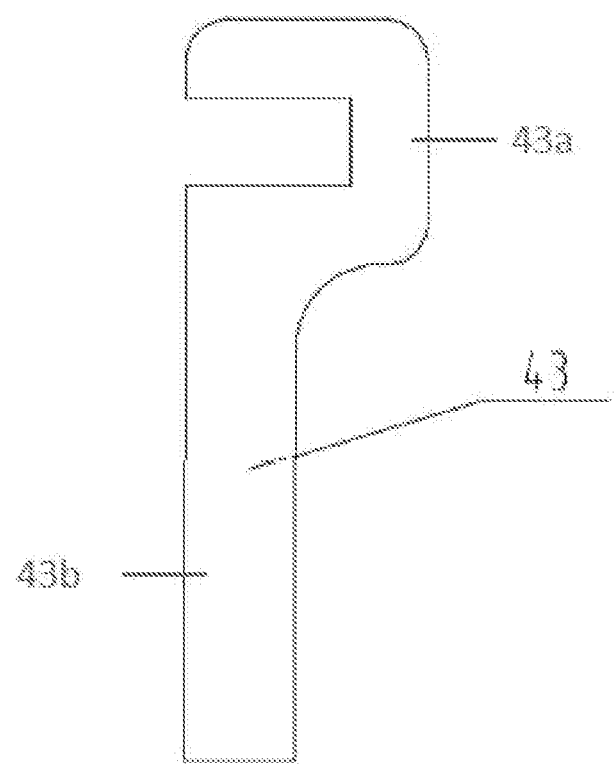
FIG. 7 is a schematic structural diagram of an upper caliper according to the present invention.

The stepwise driving apparatus 4 includes a water turbine gearbox 41, an eccentric swinging mechanism 42, an upper caliper 43, and a lower caliper 44. The water turbine gearbox 41 is fixedly mounted at a rear end of the chassis 1 at a position corresponding to the water turbine box 31, an input shaft 41a of the water turbine gearbox 41 and a water turbine 31a in the water turbine box 31 are connected coaxially and fixedly, an output shaft 41b of the water turbine gearbox 41 is disposed horizontally in a left-to-right direction. When the chassis 1 is in a horizontal state, a height of an axial line of the output shaft 41b of the water turbine gearbox 41 from the ground is less than a height of the axial line of the locking-type reel 2 from the ground, that is, when the chassis 1 is in a horizontal state, the output shaft 41b of the water turbine gearbox 41 is located at the lower rear side of the locking-type reel 2. The eccentric swinging mechanism 42 is fixedly mounted at an axial end of the output shaft 41b of the water turbine gearbox 41 at a position corresponding to the locking channel 21. As shown in FIG. 5 and FIG. 6, the eccentric swinging mechanism 42 can perform eccentric rotation movement following the rotation of the output shaft 41b of the water turbine gearbox 41. The upper caliper 43 is disposed in a front-to-back direction and mounted between the eccentric swinging mechanism 42 and the locking channel 21. As shown in FIG. 7, the upper caliper 43 includes a bayonet portion 43a and a pallet portion 43b, the bayonet portion 43a includes a bayonet that is disposed along a left-to-right opening and clamped in the locking channel 21, a width size of the bayonet is in clearance fit with a thickness size of the locking channel 21, the pallet portion 43b is a lengthwise plank structure disposed in a back-to-forth direction, a front end of the pallet portion 43b is fixedly connected to the bayonet portion 43a, and a rear end is in butt joint of the eccentric swinging mechanism 42 A structure of the lower caliper 44 is the same as a structure of the upper caliper 43 and the lower caliper 44 is located exactly below the upper caliper 43, the bayonet of the bayonet portion of the lower caliper 44 is clamped on the locking channel 21, and a rear end of the pallet portion of the lower caliper 44 is in butt joint of the chassis 1. The eccentric rotation motion of the eccentric swinging mechanism 42 may be controlled to enable the bayonet of the upper caliper 43 to be engaged with the locking channel 21 intermittently and drive the locking-type reel 2 to rotate intermittently as a whole, and the lower caliper 44 can prevent the locking-type reel 2 from reversing.

When the eccentric swinging stepwise rollback-type reel sprinkling irrigation machine is in a receiving and transferring state not for sprinkling irrigation, the sprinkling irrigation PE hose 37 is completely wound on the cylinder of the locking-type reel 2, and the lower caliper 44 is in an anti-reversal state for engaging with the locking channel 21. In this case, the rear end of the chassis 1 can be pressed down and pulled so that the front support at the front end of the chassis 1 rises up to leave the ground, so as to be transferred to another place. When a landscape architecture needs a sprinkling irrigation operation, the rear end of the chassis 1 is lifted so that the front supports at the front end of the chassis 1 are inserted into the ground to be stably supported, firstly, the upper caliper 43 and the lower caliper 44 are taken off from the position of the bayonet, secondly, the sprinkler support mechanism 33 is pushed and pulled forward to a position that needs sprinkling irrigation. When the sprinkler support mechanism 33 is moved forward, the locking-type reel 2 rotates to release the sprinkling irrigation PE hose 37, the upper caliper 43 and the lower caliper 44 are clamped and mounted again to connect the pressurized water input joint at the input end of the water turbine box 31 to a pressurized hydrant, the pressurized hydrant is opened, then pressurized water enters the water turbine box 31 to drive the water turbine 31a to rotate, then enters the sprinkling irrigation PE hose 37 through the pressurized water axial end input joint 32, and is finally sprinkled from the sprinkler 34 to realize sprinkling irrigation. The rotating water turbine 31a sequentially drives the output shaft 41b of the water turbine gearbox 41 and the eccentric swinging mechanism 42 to rotate, and during eccentric rotation of the eccentric swinging mechanism 42. When the eccentric rotation ascends, the eccentric swinging mechanism 42 drives the rear end of the upper caliper 43 to move upward, when the bayonet of the upper caliper 43 that is in clearance fit deflects to be engaged with the locking channel 21 due to the upward movement of the rear end of the upper caliper 43, the upper caliper 43 and the locking-type reel 2 are both driven by the eccentric swinging mechanism 42 to move upward to make the locking-type reel 2 rotate about an axle centre of the reel rotation shaft, so as to realize rollback, and during rollback of the locking-type reel 2, due to the gravity of the lower caliper 44, the locking channel 21 slides with respect to the bayonet of the lower caliper 44, that is, the lower caliper 44 does not roll back following the locking-type reel 2. When the eccentric rotation descends, due to the gravity, the upper caliper 43, following the eccentric swinging mechanism 42, slides downward to an initial position along the locking channel 21, and the lower caliper 44 is in a state of being engaged with the locking channel 21 to prevent the locking-type reel 2 from reversing, and the rest may be deduced by analogy, so as to realize stepwise rollback of the locking-type reel 2. When the sprinkler support mechanism 33 regresses to the initial position, the whole sprinkling irrigation process is finished and the pressurized hydrant is closed.

Since the rear end of the upper caliper 43 is in butt joint of the eccentric swinging mechanism 42, to prevent the upper caliper 43 from dropping off from the eccentric swinging mechanism 42 abnormally, in a further improved solution of the present invention, a pallet portion positioning groove 42a arranged in a circumferential direction is disposed on the eccentric swinging mechanism 42, a width size of the pallet portion positioning groove 42a fits in with a width size of the pallet portion of the upper caliper 43, and a rear end of the pallet portion of the upper caliper 43 is in butt joint of the pallet portion positioning groove 42a, and the pallet portion positioning groove 42a can position the upper caliper 43, so as to prevent the upper caliper 43 from dropping off from the eccentric swinging mechanism 42.

In an implementation of the eccentric swinging mechanism 42 of the present invention, as shown in FIG. 5, the eccentric swinging mechanism 42 is an eccentric wheel structure eccentrically mounted with the output shaft 41b of the water turbine gearbox 41, and the pallet portion positioning groove 42a is disposed on a wheel surface of the eccentric wheel structure in a radial direction.

In another implementation of the eccentric swinging mechanism 42 of the present invention, as in FIG. 6, the eccentric swinging mechanism 42 includes a support wheel 42b and an eccentric shaft 42c. The support wheel 42b is coaxially and fixedly connected to the output shaft of the water turbine gearbox 41. A central axis of the eccentric shaft 42c is disposed to be parallel to a central axis of the support wheel 42b and a bottom end of the eccentric shaft 42c is eccentrically mounted on an end face of the support wheel 42b, and a top end of the eccentric shaft 42c further includes a positioning boss. The pallet portion positioning groove is disposed in a ring-shaped space between the end face of the support wheel 42b and the positioning boss of the eccentric shaft 42c.

When the sprinkler support mechanism 33 regresses to the initial position, to prevent the locking-type reel 2 from further rolling back to damage a device, in a further improved solution of the present invention, the stepwise driving apparatus 4 further includes a rollback automatic stopping mechanism. The rollback automatic stopping mechanism includes a limiting swing retaining frame 45, a transmission connecting rod or a wire rope 47, and a swing holding rod 46. The limiting swing retaining frame 45 is hingedly connected to and mounted at a front end of the chassis 1 horizontally in the left-to-right direction, a rod body of the swing holding rod 46 is hingedly connected to and mounted at the rear end of the chassis 1 corresponding to a position between the upper caliper 43 and the lower caliper 44. A rear end of the limiting swing retaining frame 45 is connected to a front end of the rod body of the swing holding rod 46 through the transmission connecting rod or the wire rope 47, and reset springs are disposed both between the limiting swing retaining frame 45 and the chassis 1 and between the rod body of the swing holding rod 46 and the chassis 1. When the sprinkler support mechanism 33 regresses to the initial position, the sprinkler support mechanism 33 knocks the limiting swing retaining frame 45, the limiting swing retaining frame 45 rotates along the hinged shaft to swing and pulls and swings the swing holding rod 46 through the transmission connecting rod or the wire rope 47, so that the swing holding rod 46 also rotates along the hinged shaft to swing, a rear end of the swing holding rod 46 swings to lift to hold the upper caliper 43, so that the upper caliper 43 is separated from the eccentric swinging mechanism 42, and the locking-type reel 2 stops rollback.

To prevent a scattered or stacked phenomenon of the sprinkling irrigation PE hose caused by a disorderly winding sequence of the sprinkling irrigation PE hose during a rollback process of the locking-type reel 2, in a further improved solution of the present invention, the sprinkling irrigation apparatus 3 further includes a pipe row mechanism 35. The pipe row mechanism 35 includes a forward and backward 8-shaped spiral shaft and a pipe row sleeve. The forward and backward 8-shaped spiral shaft is set at a front end of the chassis 1 horizontally in the left-to-right direction and is located above the holding beam, and the forward and backward 8-shaped spiral shaft is connected to chains of the reel rotation shafts of the locking-type reel 2 in a transmission manner through a transmission chain. The pipe row sleeve is sleeved over the forward and backward 8-shaped spiral shaft, and the output end of the sprinkling irrigation PE hose passes through a U-shaped connection member disposed on the pipe row sleeve to be connected to and in communication with a bottom end of the sprinkler connection hose on the sprinkler 34.

To further prevent a scattered or stacked phenomenon of the sprinkling irrigation PE hose during a rollback process of the locking-type reel 2, in a further improved solution of the present invention, the sprinkling irrigation apparatus 3 further includes a pressurized pipe mechanism 36. The pressurized pipe mechanism 36 includes a pressurized pipe frame and a tension spring. The pressurized pipe frame is a portal frame structure, a width size of the portal frame structure fits in with a length size of the cylinder of the locking-type reel 2 and the portal frame structure is clamped between the two wing plates of the locking-type reel 2, and a bottom end of the pressurized pipe frame is hingedly connected to and mounted on two side walls of the chassis 1 in the left-to-right direction. One end of the tension spring is connected to the portal frame structure of the pressurized pipe frame and the other end is connected to a side wall of the chassis, and the tension spring can make the pressurized pipe frame always press against the cylinder of the locking-type reel 2.

Since rollback driven by the water turbine may cause a change of an angular velocity due to a change of a quantity of layers of the sprinkling irrigation PE hose wound on the locking-type reel, to realize uniform rollback of the sprinkling irrigation PE hose, in a further improved solution of the present invention, a flow adjustment valve is disposed on the pressurized water input joint of the water turbine box 31, the pressurized pipe mechanism 36 is disposed behind the locking-type reel 2, and a hinged shaft at the bottom end of the pressurized pipe frame is connected to the flow adjustment valve through a connection rod mechanism. During a process that the sprinkling irrigation PE hose is rewound on the locking-type reel 2, the pressurized pipe frame has a hinging angle changed due to a change of a quantity of layers of the sprinkling irrigation PE hose rewound on the reel 2, and the hinged shaft at the bottom end of the pressurized pipe frame can control an opening degree of the flow adjustment valve through a connection rod mechanism, thereby realizing uniform rollback of the sprinkling irrigation PE hose.

For sprinkling irrigation of a lawn, to simplify the setting of the mechanism, in an implementation of the sprinkler support mechanism 33 of the present invention, the sprinkler support mechanism 33 is a holding plate structure that is in horizontal arrangement or that leans forward. The base plane of the pallet structure contacts the lawn directly during a rollback process of a sprinkling irrigation PE hose and directly slides on the lawn.

For sprinkling irrigation of bush, in another implementation of the sprinkler support mechanism 33 of the present invention, the sprinkler support mechanism 33 is a sprinkler wagon structure.

A water turbine is used in the eccentric swinging stepwise rollback-type reel sprinkling irrigation machine to drive the eccentric swinging mechanism 42 to realize an eccentric swing, so as to drive the upper caliper 43 to move up and down to be engaged with the locking channel 21 of the locking-type reel 2 intermittently, thereby driving the locking-type reel 2 to roll back intermittently to automatically reel in a sprinkling irrigation PE hose. During an intermittent rollback process of the locking-type reel 2, the lower caliper 44 can prevent the locking-type reel 2 from reversing. The whole structure is simple, may perform sprinkling irrigation on vegetation of a landscape architecture conveniently, and may be used flexibly and maintained easily. A water delivery pipeline does not need to be pre-buried in a sprinkling irrigation area of a landscape architecture and problems such as a spacing between sprinklers do not need to be considered. The self-moving sprinkling irrigation manner may realize horizontal and uniform distribution of water resources in sprinkled and irrigated soil in a precondition of reducing water resources, ensure uniform irrigation, reduce an amount of work of construction of a landscape architecture, and reduce construction costs, and is especially suitable for sprinkling irrigation of a landscape architecture.

What is claimed is:

1. An eccentric swinging stepwise rollback-type reel sprinkling irrigation machine, comprising a chassis and a sprinkling irrigation apparatus, wherein the chassis is a box-shaped support frame structure with a top portion, a bottom portion, and a rear portion that are open, a support wheel is provided at a rear end of the bottom portion of the chassis, front supports that incline toward a lower forward direction are respectively disposed on left and right sides of a front end of the bottom portion of the chassis, and a holding beam that is disposed in a horizontal direction and fixedly connected to the two front supports is disposed between the two front supports; the sprinkling irrigation apparatus comprises a sprinkling irrigation PE hose, a water turbine box, a pressurized water axial end input joint, a sprinkler support mechanism, and a sprinkler, wherein:

the eccentric swinging stepwise rollback-type reel sprinkling irrigation machine further comprises a locking-type reel and a stepwise driving apparatus;

the locking-type reel comprises a cylinder, wing plates, and reel rotation shafts; the cylinder is a hollow cylindrical structure; the wing plates have a disk-shaped structure, a quantity of the wing plates is set to two, the two wing plates are coaxial with the cylinder respectively and fixedly disposed at two ends of the cylinder, a size of an outer diameter of the wing plates is greater than a size of an outer diameter of the cylinder, opposite inner surfaces of the two wing plates and an outer surface of the cylinder together form an accommodating space for the sprinkling irrigation PE hose, an outer surface of at least one wing plate further has a locking channel protruding from an outer surface of the wing plate, the locking channel is set to be a sealed ring structure along a circumferential edge position of the wing plate, and the ring structure is disposed concentrically with the wing plate; a quantity of the reel rotation shafts is set to two, the reel rotation shafts are coaxially disposed at central positions of the two wing plates in a left-to-right symmetric arrangement, and the locking-type reel is set to roll back and forth and is mounted on the chassis through the reel rotation shafts;

the water turbine box is fixedly mounted at a rear end of the chassis, a water turbine is disposed in the water turbine box, a pressurized water input joint is disposed at an input end of the water turbine box, an output end of the water turbine box is connected to and is in communication with an input end of the pressurized water axial end input joint through a pipeline; an output end of the pressurized water axial end input joint is coaxially and fixedly mounted at an axial end of one reel rotation shaft of the locking-type reel; the sprinkling irrigation PE hose is wound on the cylinder of the locking-type reel, an input end of the sprinkling irrigation PE hose is connected to and is in communication with the output end of the pressurized water axial end input joint, and an output end of the sprinkling irrigation PE hose extends out from a top of the holding beam of the chassis; the sprinkler comprises a sprinkler connection hose mounted on the sprinkler support mechanism in a vertical direction and a sprinkler head mounted at a top of the sprinkler connection hose, and a bottom end of the sprinkler connection hose of the sprinkler is connected to and is in communication with the output end of the sprinkling irrigation PE hose; and the stepwise driving apparatus comprises a water turbine gearbox, an eccentric swinging mechanism, an upper caliper, and a lower caliper; the water turbine gearbox is fixedly mounted at a rear end of the chassis at a position corresponding to the water turbine box, an input shaft of the water turbine gearbox and the water turbine in the water turbine box are connected coaxially and fixedly, an output shaft of the water turbine gearbox is disposed horizontally in a left-to-right direction, and when the chassis is in a horizontal state, a height of an axial line of the output shaft of the water turbine gearbox from the ground is less than a height of the axial line of the locking-type reel from the ground; the eccentric swinging mechanism is fixedly mounted at an axial end of the output shaft of the water turbine gearbox at a position corresponding to the locking channel; the upper caliper is disposed in a front-to-back direction and mounted between the eccentric swinging mechanism and the locking channel, the upper caliper comprises a bayonet portion and a pallet portion, the bayonet portion comprises a bayonet that is disposed along a left-to-right opening and clamped in the locking channel, a width size of the bayonet is in clearance fit with a thickness size of the locking channel, the pallet portion is a lengthwise plank structure disposed in a back-to-forth direction, a front end of the pallet portion is fixedly connected to the bayonet portion, and a rear end is in butt joint of the eccentric swinging mechanism; a structure of the lower caliper is the same as a structure of the upper caliper and the lower caliper is located exactly below the upper caliper, and the bayonet of the bayonet portion of the lower caliper is clamped on the locking channel.

2. The eccentric swinging stepwise rollback-type reel sprinkling irrigation machine according to claim 1, wherein a pallet portion positioning groove arranged in a circumferential direction is disposed on the eccentric swinging mechanism, a width size of the pallet portion positioning groove fits in with a width size of the pallet portion of the upper caliper, and a rear end of the pallet portion of the upper caliper is in butt joint of the pallet portion positioning groove.

3. The eccentric swinging stepwise rollback-type reel sprinkling irrigation machine according to claim 2, wherein the eccentric swinging mechanism is an eccentric wheel structure eccentrically mounted with the output shaft of the water turbine gearbox, and the pallet portion positioning groove is disposed on a wheel surface of the eccentric wheel structure in a radial direction.

4. The eccentric swinging stepwise rollback-type reel sprinkling irrigation machine according to claim 2, wherein the eccentric swinging mechanism comprises a support wheel and an eccentric shaft; the support wheel is coaxially and fixedly connected to the output shaft of the water turbine gearbox; a central axis of the eccentric shaft is disposed to be parallel to a central axis of the support wheel and a bottom end of the eccentric shaft is eccentrically mounted on an end face of the support wheel, and a top end of the eccentric shaft further comprises a positioning boss; and the pallet portion positioning groove is disposed in a ring-shaped space between the end face of the support wheel and the positioning boss of the eccentric shaft.

5. The eccentric swinging stepwise rollback-type reel sprinkling irrigation machine according to claim 1, wherein the stepwise driving apparatus further comprises a rollback automatic stopping mechanism, the rollback automatic stopping mechanism comprises a limiting swing retaining frame, a transmission connecting rod or a wire rope, and a swing holding rod, the limiting swing retaining frame is hingedly connected to and mounted at a front end of the chassis horizontally in the left-to-right direction, a rod body of the swing holding rod is hingedly connected to and mounted at the rear end of the chassis corresponding to a position between the upper caliper and the lower caliper, a rear end of the limiting swing retaining frame is connected to a front end of the rod body of the swing holding rod through the transmission connecting rod or the wire rope, and reset springs are disposed both between the limiting swing retaining frame and the chassis and between the rod body of the swing holding rod and the chassis.

6. The eccentric swinging stepwise rollback-type reel sprinkling irrigation machine according to claim 1, wherein the sprinkling irrigation apparatus further comprises a pipe row mechanism, and the pipe row mechanism comprises a forward and backward 8-shaped spiral shaft and a pipe row sleeve; the forward and backward 8-shaped spiral shaft is set at a front end of the chassis horizontally in the left-to-right direction and is located above the holding beam, and the forward and backward 8-shaped spiral shaft is connected to contains of the reel rotation shafts of the locking-type reel in a transmission manner through a transmission chain; the pipe row sleeve is sleeved over the forward and backward 8-shaped spiral shaft, and the output end of the sprinkling irrigation PE hose passes through a U-shaped connection member disposed on the pipe row sleeve to be connected to and in communication with a bottom end of the sprinkler connection hose on the sprinkler.

7. The eccentric swinging stepwise rollback-type reel sprinkling irrigation machine according to claim 1, wherein the sprinkling irrigation apparatus further comprises a pressurized pipe mechanism, the pressurized pipe mechanism comprises a pressurized pipe frame and a tension spring; the pressurized pipe frame is a portal frame structure, a width size of the portal frame structure fits in with a length size of the cylinder of the locking-type reel and the portal frame structure is clamped between the two wing plates of the locking-type reel, and a bottom end of the pressurized pipe frame is hingedly connected to and mounted on two side walls of the chassis in the left-to-right direction; one end of the tension spring is connected to the portal frame structure of the pressurized pipe frame and the other end is connected to a side wall of the chassis.

8. The eccentric swinging stepwise rollback-type reel sprinkling irrigation machine according to claim 7, wherein a flow adjustment valve is disposed on the pressurized water input joint of the water turbine box, the pressurized pipe mechanism is disposed behind the locking-type reel, and a hinged shaft at the bottom end of the pressurized pipe frame is connected to the flow adjustment valve through a connection rod mechanism.

9. The eccentric swinging stepwise rollback-type reel sprinkling irrigation machine according to claim 1, wherein the sprinkler support mechanism is a holding plate structure that is in horizontal arrangement or that leans forward.

10. The eccentric swinging stepwise rollback-type reel sprinkling irrigation machine according to claim 1, wherein the sprinkler support mechanism is a sprinkler wagon structure.

* * * * *